(12) United States Patent
Jeong et al.

(10) Patent No.: US 10,743,244 B2
(45) Date of Patent: *Aug. 11, 2020

(54) ACTIVE SCANNING METHOD IN WIRELESS LAN SYSTEM

(71) Applicant: KT Corporation, Seongnam-si, Gyeonggi-do (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,146

(22) Filed: Aug. 2, 2017

(65) Prior Publication Data

US 2017/0332315 A1    Nov. 16, 2017

Related U.S. Application Data

(63) Continuation of application No. 14/415,476, filed as application No. PCT/KR2013/006412 on Jul. 18, 2013, now Pat. No. 9,756,554.

(30) Foreign Application Priority Data

Jul. 18, 2012    (KR) .................. 10-2012-0078036

(51) Int. Cl.
*H04W 48/10* (2009.01)
*H04W 48/16* (2009.01)
*H04W 48/14* (2009.01)
*H04W 84/12* (2009.01)

(52) U.S. Cl.
CPC .......... *H04W 48/16* (2013.01); *H04W 48/10* (2013.01); *H04W 48/14* (2013.01); *H04W 84/12* (2013.01)

(58) Field of Classification Search
CPC ..... H04W 84/12; H04W 48/10; H04W 48/14; H04W 48/16; H04L 45/00; H04L 45/02; H04L 45/04
USPC ....................................................... 370/254
See application file for complete search history.

(56) References Cited

U.S. PATENT DOCUMENTS

| 7,453,848 | B2 | 11/2008 | Jang |
| 7,664,129 | B2 | 2/2010 | Takagi et al. |
| 7,957,346 | B2 | 6/2011 | Nabetani |
| 8,402,087 | B2 | 3/2013 | O'Shea et al. |
| 8,549,634 | B2 | 10/2013 | Dubey et al. |

(Continued)

FOREIGN PATENT DOCUMENTS

| JP | 2006-014258 A | 1/2006 |
| JP | 2007-221286 A | 8/2007 |

(Continued)

OTHER PUBLICATIONS

International Search Report for PCT/KR2013/006412 dated Oct. 28, 2013.

*Primary Examiner* — Phong La
(74) *Attorney, Agent, or Firm* — Sughrue Mion, PLLC

(57) ABSTRACT

Disclosed is an active scanning method in a wireless LAN system. The active scanning method comprises: a step of transmitting a probe request frame via a predetermined channel; and a step of receiving, from an access point, a probe response frame corresponding to the probe request frame via a predetermined channel. The probe response frame includes main channel information on the access point. Thus, the access point can be quickly scanned.

6 Claims, 12 Drawing Sheets

(56) References Cited

U.S. PATENT DOCUMENTS

| | | |
|---|---|---|
| 9,066,283 B2 | 6/2015 | Seok |
| 2004/0039817 A1 | 2/2004 | Lee et al. |
| 2006/0073827 A1* | 4/2006 | Vaisanen ........... H04W 36/0055 455/436 |
| 2006/0111103 A1 | 5/2006 | Jeong et al. |
| 2006/0159041 A1* | 7/2006 | Zhun ................. H04W 74/0808 370/328 |
| 2009/0092154 A1* | 4/2009 | Malik ................ H04L 12/2856 370/480 |
| 2010/0177756 A1* | 7/2010 | Choi ................... H04W 72/042 370/338 |
| 2011/0110349 A1* | 5/2011 | Grandhi .............. H04W 28/18 370/338 |
| 2011/0149766 A1 | 6/2011 | Choi et al. |
| 2011/0173276 A1 | 7/2011 | Eizips et al. |
| 2011/0188487 A1* | 8/2011 | Seok .................... H04W 16/26 370/338 |
| 2011/0255401 A1 | 10/2011 | Seok |
| 2012/0026909 A1 | 2/2012 | Seok |
| 2012/0184318 A1 | 7/2012 | Lee et al. |
| 2013/0003679 A1 | 1/2013 | Seok et al. |
| 2013/0033995 A1* | 2/2013 | Kraglund ............. H04W 48/16 370/252 |
| 2013/0165112 A1 | 6/2013 | Gopalsamy et al. |
| 2013/0176890 A1* | 7/2013 | Sharma ............. H04B 7/15557 370/252 |
| 2013/0176980 A1* | 7/2013 | Kneckt ................ H04W 28/26 370/329 |
| 2013/0232253 A1 | 9/2013 | Elhaddad et al. |
| 2013/0235852 A1 | 9/2013 | Segev et al. |
| 2014/0254566 A1 | 9/2014 | Qi et al. |
| 2014/0376392 A1 | 12/2014 | Hedge et al. |

FOREIGN PATENT DOCUMENTS

| | | |
|---|---|---|
| JP | 2009-022022 A | 1/2009 |
| JP | 4421459 B2 | 2/2010 |
| JP | 2013-519331 A | 5/2013 |
| KR | 10-2007-0102847 A | 10/2007 |
| KR | 10-2010-0072687 A | 7/2010 |
| WO | 2011099729 A2 | 8/2011 |
| WO | 2012/035196 A1 | 3/2012 |

* cited by examiner

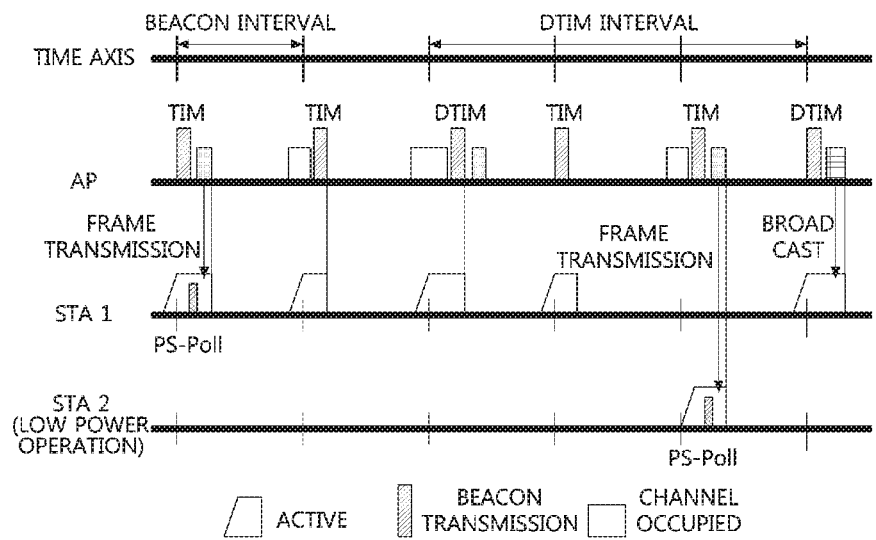

FIG. 5

| ORDER | INFORMATION | NOTES |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |
| 10 | Country | Included if dot11MultiDomainCapabilityEnabled or dot11SpectrumManagementRequired is true. |
| 11 | FH Parameters | FH Parameters, as specified in 7.3.2.10, may be included if dot11MultiDomainCapabilityEnabled is true. |
| 12 | FH Pattern Table | FH Pattern Table information, as specified in 7.3.2.11, may be included if dot11MultiDomainCapabilityEnabled is true. |
| 13 | Power Constraint | Shall be included if dot11SpectrumManagementRequired is true. |
| 14 | Channel Switch Announcement | May be included if dot11SpectrumManagementRequired is true. |

FIG. 6

| ORDER | INFORMATION | NOTES |
|---|---|---|
| 15 | Quiet | May be included if dot11SpectrumManagementRequired is true. |
| 16 | IBSS DFS | Shall be included if dot11SpectrumManagementRequired is true in an IBSS. |
| 17 | TPC Report | Shall be included if dot11SpectrumManagementRequired is true. |
| 18 | ERP Information | The ERP Information element is present within Probe Response frames generated by STAs using ERPs and is optionally present in other cases. |
| 19 | Extended Supported Rates | The Extended Supported Rates element is present whenever there are more than eight supported rates, and it is optional otherwise. |
| 20 | RSN | The RSN information element is only present within Probe Response frames generated by STAs that have dot11RSNAEnabled set to TRUE. |
| 21 | BSS Load | The BSS Load element is present when dot11QosOption-Implemented and dot11QBSSLoadImplemented are both true. |
| 22 | EDCA Parameter Set | The EDCA Parameter Set element is present when dot11QosOptionImplemented is true. |
| Last-1 | Vendor Specific | One or more vendor-specific information elements may appear in this frame. This information element follows all other information elements, except the Requested Information elements. |
| Last-n | Requested information elements | Elements requested by the Request information element of the Probe Request frame. |

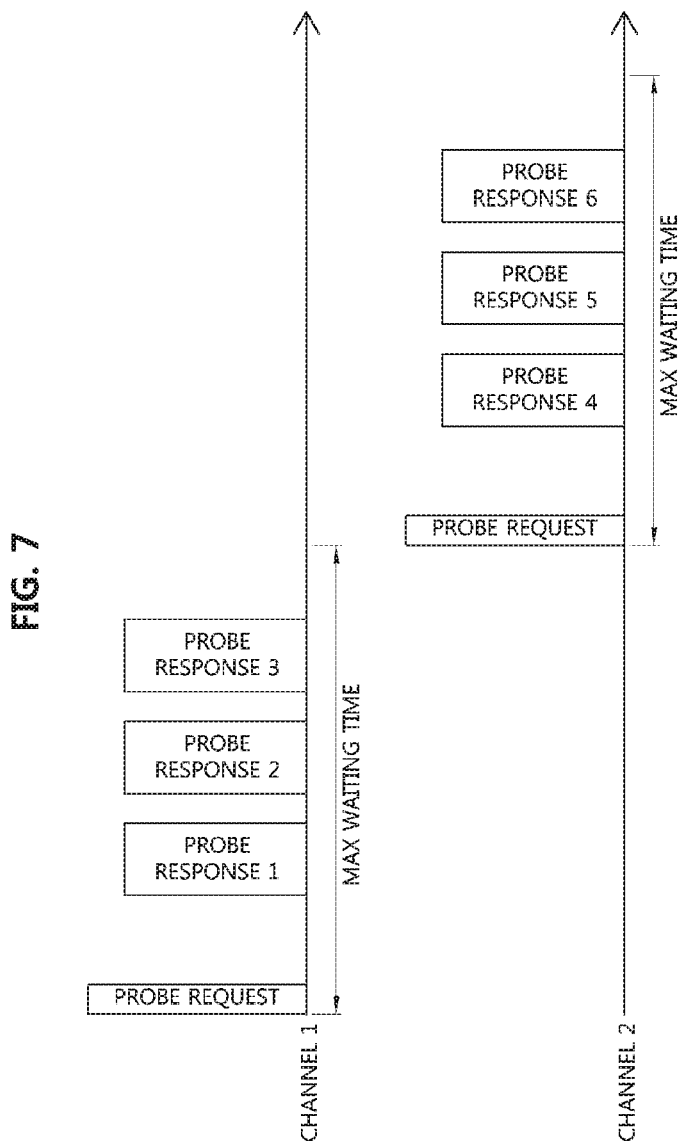

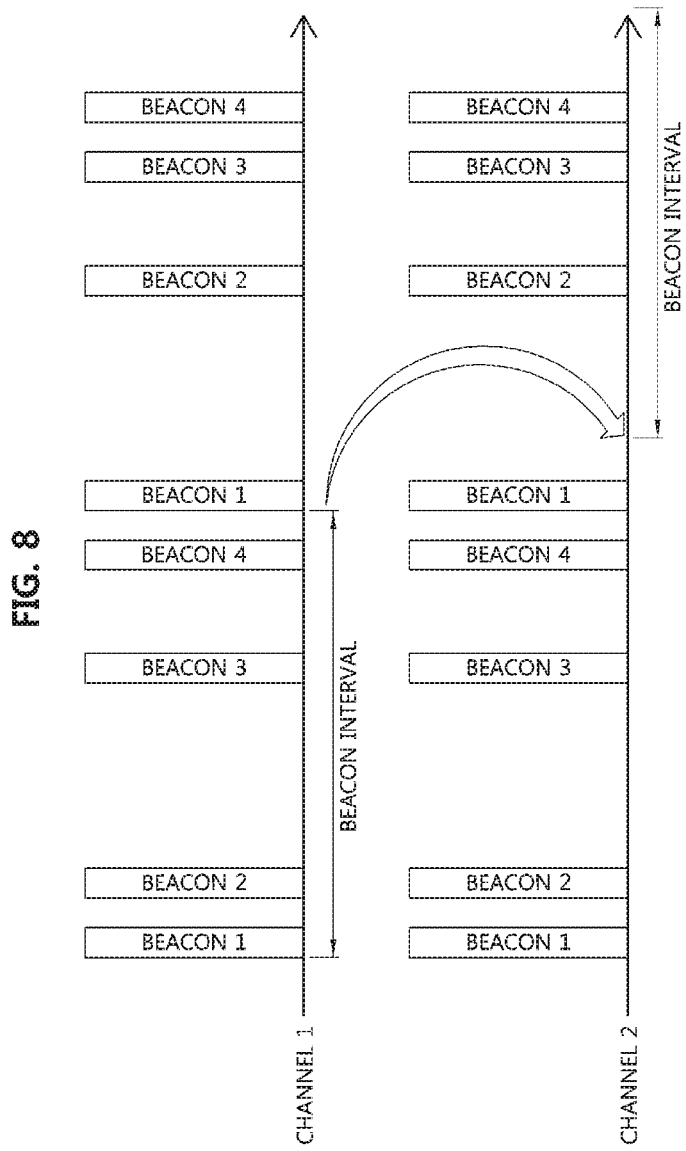

ACTIVE SCANNING METHOD IN WIRELESS LAN SYSTEM

CLAIM FOR PRIORITY

This application is a continuation application of U.S. application Ser. No. 14/415,476, filed Jan. 16, 2015, which is a National Stage Entry of PCT/KR2013/006412 filed on Jul. 18, 2013, which claims priority to Korean Patent Application No. 2012-0078036 filed on Jul. 18, 2012 in the Korean Intellectual Property Office (KIPO), the entire contents of which are hereby incorporated by reference in their entireties.

BACKGROUND

1. Technical Field

Example embodiments of the present invention relate in general to the field of an active scanning method, and more particularly, to an access point scanning method in a wireless LAN system.

2. Related Art

Various wireless communication technologies have been developed together with information communication technologies. One such wireless communication technology, a wireless local area network (WLAN), is a technology allowing wireless Internet access at a home or business or at a designated service providing region using a portable terminal, such as a personal digital assistant (PDA), a laptop computer and a portable multimedia player (PMP) based on wireless frequency technologies.

As standards for WLANs, Institute of Electrical and Electronics Engineers (IEEE) 802.11 standards have been developed. IEEE 802.11a provides a transmission speed of 54 Mbps by using an unlicensed band of 5 GHz. IEEE 802.11b provides a transmission speed of 11 Mbps by using direct sequence spread spectrum (DSSS) at 2.4 GHz. IEEE 802.11g provides a transmission speed of 54 Mbps by using orthogonal frequency division multiplexing (OFDM) at 2.4 GHz. IEEE 802.11n provides a transmission speed of 300 Mbps with respect to two spatial streams by using multiple input multiple output (MIMO)-OFDM. IEEE 802.11n supports a channel bandwidth of 40 MHz at the maximum, and provides a transmission speed of 600 Mbps.

As the development of WLANs becomes more active and applications using WLANs are diversified, there is an increasing need for a new WLAN technology capable of supporting a throughput higher than that the data processing speed supported by IEEE 802.11n. WLAN technology for very high throughput (VHT) is one of the IEEE 802.11 WLAN technologies suggested to support a data processing speed of 1 Gbps or more. As one of the VHT WLAN technologies, IEEE 802.11ac is being developed as a standard for supporting a VHT at a frequency band of 5 GHz or below, and IEEE 802.11ad is being developed as a standard for supporting a VHT at a frequency band of 60 GHz.

In a system based on the above described WLAN technology, a station performing active scanning on multiple channels has difficulty identifying in which channel a desired access point is located, and thus sequentially performs the same scan on each of the multiple channels. That is, a station transmits a probe request frame on a channel, and receives probe response frames transmitted from access points during a maximum waiting time, and if the station fails to find a desired access point on the current channel, the station performs the same process on another channel.

Meanwhile, if an access point supports multiple channels and receives a probe request frame through a primary channel, the access point transmits a probe response frame in response to the probe request frame, but for a probe request frame received through a secondary channel, the access point does not respond and transmit a probe response frame.

In this environment, in order to find a desired access point, a station needs to scan a plurality of channels, which causes a great amount of time to be taken to find the access point.

SUMMARY

Accordingly, example embodiments of the present invention are provided to substantially obviate one or more problems due to limitations and disadvantages of the related art.

Example embodiments of the present invention provide an active scanning method for rapidly finding an access point.

In some example embodiments, an active scanning method performed at a station includes: transmitting a probe request frame through a certain channel; and receiving the certain channel from an access point through a probe response frame corresponding to the probe request frame, wherein the probe response frame includes information about a primary channel of the access point.

The active scanning method may further include: performing access to the access point on a channel represented by the information about the primary channel.

The certain channel may be a secondary channel of the access point.

In other example embodiments, an active scanning method performed at a station includes: transmitting probe request frames through multiple channels; and receiving probe response frames corresponding to the probe request frames from access points through the multiple channels, wherein the probe response frames include primary channel information of each of the access points.

The active scanning method may further include: performing access to an access point on a channel represented by one of a plurality of pieces of primary channel information received from the access points.

The probe request frames may be simultaneously transmitted through the multiple channels.

The multiple channels may include a primary channel and a secondary channel of the access point.

In still other example embodiments, an active scan-based responding method performed at an access point includes: receiving a probe request frame through a certain channel; generating a probe response frame including information about a primary channel of the access point; and transmitting the probe response frame through the certain channel.

The active scan-based responding method may further include performing access to a station based on an access request of the station through the primary channel.

The certain channel may be a secondary channel of the access point.

In still other example embodiments, an active scan-based responding method performed at access points includes: receiving probe request frames through multiple channels; and generating a probe response frame including information a primary channel of the access point.

The active scan-based responding method may further include transmitting the probe response frame through the primary channel among the multiple channels.

The active scan-based responding method may further include performing access with respect to the station based on an access request of the station through the primary channel. The multiple channels may include a primary channel and a secondary channel of the access point.

BRIEF DESCRIPTION OF DRAWINGS

Example embodiments of the present invention will become more apparent by describing in detail example embodiments of the present invention with reference to the accompanying drawings, in which:

FIG. 3 is a conceptual view illustrating a data transmission process of an access point according to an example embodiment of the present invention.

FIG. 4 is a conceptual view illustrating the configuration of a probe request frame.

FIG. 5 is a conceptual view illustrating the configuration of a probe response frame (1 to 14).

FIG. 6 is a conceptual view illustrating the configuration of a probe response frame (15 to Last-n).

FIG. 7 is a conceptual view illustrating an active scanning method in multiple channels.

FIG. 8 is a conceptual view illustrating a passive scanning method in multiple channels.

DESCRIPTION OF EXAMPLE EMBODIMENTS

Figure 1:
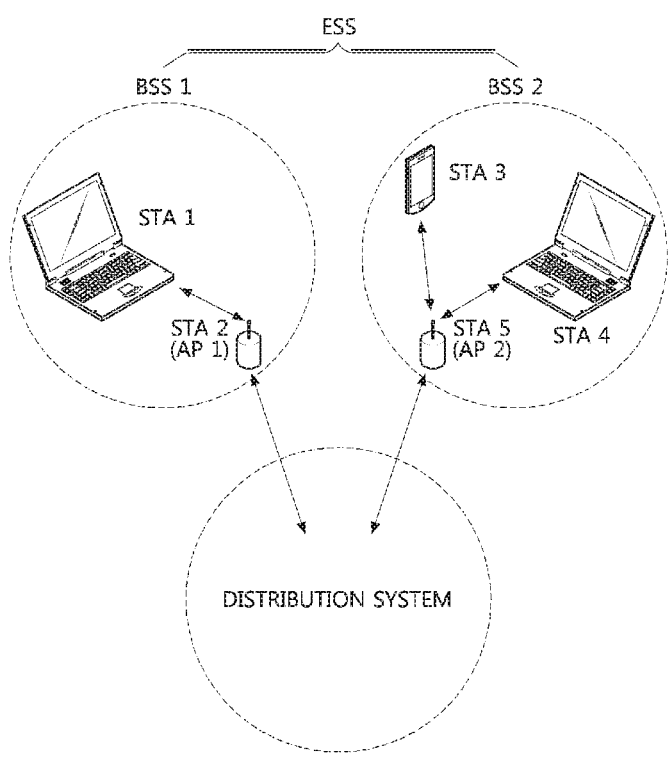
FIG. 1 is a conceptual view illustrating the configuration of an IEEE 802.11 wireless local area network (WLAN) system according to an example embodiment of the present invention.

Example embodiments of the present invention are disclosed herein. However, specific structural and functional details disclosed herein are merely representative for purposes of describing example embodiments of the present invention, and example embodiments of the present invention should not be construed as limited to example embodiments set forth herein, but may be embodied in many alternate forms.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred example embodiments of the present invention will be described in detail with reference to the accompanying drawings. The same elements may have the same reference numerals to provide better understanding of the specification, and repetition of the details of identical elements will be omitted in order to avoid redundancy.

In this specification, a station STA represents a certain functional medium including a physical layer interface with respect to a medium access control (MAC) and a wireless medium according to provisions in IEEE 802.11 standards. The station STA is classified as a station serving as an access point AP or a station serving as a non-access point non-AP. A station serving as an access point AP is referred to as an access point AP, and a station serving as a non-access point non-AP is referred to as a terminal.

The station includes a processor and a transceiver, and may further include a user interface and a display device. The processor represents a unit that is designed to generate a frame to be transmitted through a wireless network, or designed to process a frame received through a wireless network, and in order to control the station STA, the processor performs various functions. The transceiver represents a unit functionally connected to the processor, and is designed to transmit and receive a frame for a station STA through a wireless network.

An access point AP may represent a centralized control device, a base station BS, a node-B, an e node-B, a base transceiver system (BTS) or a site control device, and may have some or all functions thereof.

A station may represent a wireless transmit/receive unit (WTRU), user equipment (UE), a user terminal (UT), an access terminal (AT), a mobile station (MS), a mobile terminal, a subscriber unit, a subscriber station (SS), a wireless device, or a mobile subscriber unit, and may have some or all functions thereof.

A station may perform communication using a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, and a digital video player.

FIG. 1 is a conceptual view illustrating the configuration of an IEEE 802.11 wireless local area network (WLAN) system according to an example embodiment of the present invention.

Referring to FIG. 1, an IEEE 802.11 WLAN system includes at least one basic service set (BSS). BSS represents a set of stations STA 1, STA 2 (AP 1), STA 3, STA 4, and STA 5 (AP 2) that may communicate with each other by performing synchronization with each other, rather than representing a designated region.

BSSs are divided into infrastructure BSSs and independent BSSs (IBSSs), and BSS 1 and BSS 2 each represent an infrastructure BSS. BSS1 may include a station STA1, an access point STA2 (AP1) providing a distribution service, and a distribution system DS connecting a plurality of access points STA2 (AP1) and STA5 (AP2). In BSS1, the access point STA2 (AP1) manages the station STA1.

BSS2 may include stations STA3 and STA4, an access point STA5 (AP2) providing a distribution service, and the distribution system DS connecting a plurality of access points STA2 (AP1) and STA5 (AP2). In BSS2, the access point STA5 (AP2) manages the stations STA3 and STA4.

Meanwhile, an independent BSS is a BSS operating in an ad-hoc mode. Since an IBSS does not include an access point, there is no centralized management entity performing a management function at the center of the IBSS. That is, stations in an IBSS are managed in a distributed manner. All of the stations in the IBSS may be provided as a mobile station, and form a self-contained network since the stations are not allowed access to the DS.

The access points STA2 (AP1) and STA5 (AP2) each provide the stations STA1, STA3 and STA4 connected thereto with access to a DS through a wireless medium. In general, communication between the stations STA1, STA3 and STA4 in the BSS1 or the BSS2 is achieved through the access points STA 2 (AP 1) and STA 5 (AP 2). However, when a direct link is set, direction communication between the stations STA1, STA3 and STA4 may be possible.

A plurality of infrastructure BSSs may be connected to each other through the distribution system DS. The plurality of BSSs connected through the distribution system DS are referred to as an extended service set (ESS). Stations included in an ESS may communicate with each other, and a station in the same ESS may move from one BSS to another BSS while performing seamless communication.

The distribution system DS is a mechanism for allowing one access point to communicate with another access point. The distribution system DS may allow an access point to transmit a frame provided for stations connected to a BSS that is managed by the access point, or to transmit a frame provided for a station that has moved to another BSS. In addition, the access point may transmit a frame with an external network, such as a wired network. The distribution system DS need not be a network, and may be implemented in various forms as long as it provides a predetermined distribution service set on IEEE 802.11 standards. For example, the distribution system may be a wireless network, such as a mesh network, or a physical structure connecting access points to each other.

An active scanning method according to an example embodiment of the invention may be applied to the IEEE 802.11 wireless system described above, and further applied to various networks, such as a WPAN (Wireless Personal Area Network) and a WBAN (Wireless Body Area Network), in addition to an IEEE 802.11 wireless system.

Figure 2:
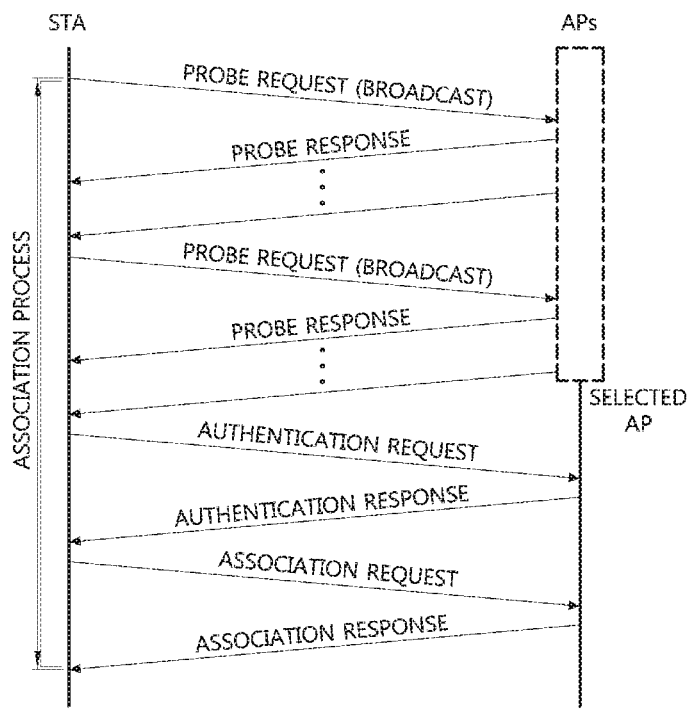
FIG. 2 is a conceptual view illustrating an association process of a station in an infrastructure basic service set (BSS).

FIG. 2 is a conceptual view illustrating an association process of a station in an infrastructure basic service set (BSS).

In order for a station STA to transmit and receive data in an IBSS, first, the station STA needs to be connected to an access point AP.

Referring to FIG. 2, an association process of a station STA in an infrastructure BSS is largely divided into 1) a probe step of searching for an access point AP, 2), an authentication step of authenticating the found access point, and 3) and an association step of performing association with the authenticated access point AP.

The station STA may search for nearby access points through a probe process. The probe process is classified as a passive scanning method or an active scanning method. The passive scanning method is performed by overhearing a beacon transmitted by nearby access points APs. Meanwhile, the active scanning method is performed by broadcasting probe request frames. An access point having received the probe request frame may transmit a probe response frame corresponding to the probe request frame to a corresponding station. The station STA may determine whether there are nearby access points APs by receiving the probe response frames.

Thereafter, the station STA performs authentication with respect to the found access point AP, thereby performing authentication with respect to the plurality of access points APs. Authentication algorithms according to the IEEE 802.11 standard are classified into an open system algorithm for exchanging two authentication frames and a shared key algorithm for exchanging four authentication frames. By exchanging an authentication request frame and an authentication response frame based on such an authentication algorithm, the station STA performs authentication with respect to access points AP.

Finally, the station STA selects one access point among the plurality of authenticated access points APs, and performs an association with the selected access point AP. That is, a station STA transmits an association request frame to the selected access point AP, and the access point AP having received the association request frame transmits an association response frame corresponding to the association request frame to the station STA. Through the process of exchanging the association request frame and the association response frame, the station STA performs the association with respect to the access point AP.

FIG. 3 is a conceptual view illustrating a data transmission process of an access point according to an example embodiment of the present invention.

Referring to FIG. 3, an access point AP periodically broadcasts a beacon, and broadcasts a beacon including a delivery traffic indication message (DTIM) at an interval of three beacons. A station STA1 and STA2 in a power save mode (PSM) may periodically awaken and receive beacons, and check a traffic indication map (TIM) or DTIM included in the beacon, thereby determining whether data to be transmitted to the station STA1 and STA2 is buffered in the access point. If the data is buffered in the access point, the station STA1 and STA2 is kept awake to receive the data from the access point AP. If the data is not buffered in the access point, the station STA1 and STA2 returns to a power save mode (PSM), that is, a doze state.

That is, if a bit in a TIM corresponding to AID of the station STA1 and STA2 is set to 1, the station STA1 and STA2 sends an access point AP a Power Save (PS)-Poll frame (or a trigger frame) indicating that the station STA1 and STA2 is awake and ready to receive data, and the access point AP confirms that the station STA1 and STA2 is ready to receive data by receiving the PS-Poll frame, and transmits data or an acknowledgement (ACK) to the station STA1 and STA2. When an ACK is transmitted to the station STA1 and STA2, the access point AP transmits data to the station STA1 and STA2 at an adequate point in time. Meanwhile, if a bit in a TIM corresponding to AID of the station STA1 and STA2 is set to 0, the station STA1 and STA2 returns to a power save mode (PSM).

Access point scanning methods include an active scanning method and a passive scanning method. According to the active scanning method, a station transmits a probe request frame having the configuration shown in FIG. 4, and an access point having received the probe request frame responds by transmitting a probe response frame having the configuration shown in FIGS. 5 and 6. FIG. 4 is a conceptual view illustrating the configuration of a probe request frame, and FIGS. 5 and 6 are conceptual views illustrating the configuration of a probe response frame.

FIG. 7 is a flowchart showing an active scanning method in multiple channels.

Referring to FIG. 7, since a station is not aware of a channel in which a desired access point (that is, an access point to which access is desired), the station sequentially performs the same scanning process in each channel. The station may transmit a probe request frame in a channel, and during a maximum waiting time, receive probe response frames from access points. In this case, when the station receives a probe response frame from a desired access point, the station may perform an access process (that is, an authentication process and an association process) with respect to the access point.

Meanwhile, when the station fails to receive a probe response frame from a desired access point, the station may move to another channel and perform the above process. If there is an access point desired by the station in an $N^{th}$ channel, the amount of time taken to find the corresponding access point is [Nxmax waiting time].

FIG. 8 is a conceptual view illustrating a passive scanning method in multiple channels.

Referring to FIG. 8, a station scans an access point by receiving a beacon frame that is periodically transmitted from the access point. The station is not aware of when a desired access point (that is, an access point to which access is desired) transmits a beacon frame, and thus the station receives beacon frames during a predetermined time that is set for one channel (for example, a normal beacon interval of an access point), and moves to another channel.

Figure 9:
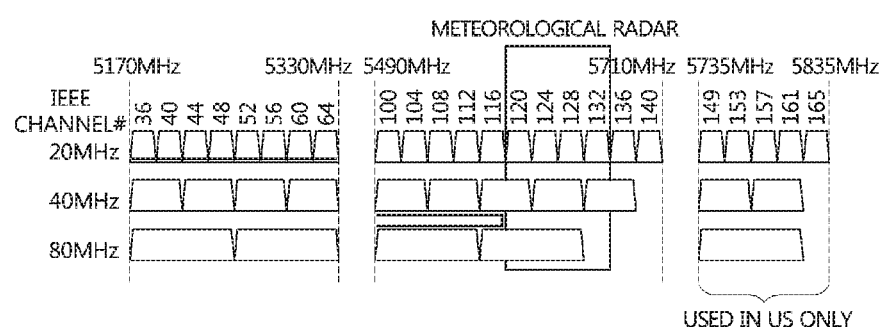
FIG. 9 is a conceptual view illustrating a channel configuration of a 5 GHz band.

FIG. 9 is a conceptual view illustrating the channel configuration of a 5 GHz band Referring to FIG. 9, the IEEE 802.11n standard or the IEEE 802.11ac standard provide that broadband data may be transmitted by simultaneously using a primary channel and a plurality of secondary channels. The IEEE 802.11ac standard provides that 40 MHz, 80 MHz and 160 MHz are supported in addition to 20 MHz.

However, it is provided that management frames, such as a probe request frame and probe response frame for active scanning and a beacon frame for passive scanning, are transmitted and received only through a primary channel. For example, when an access point uses channel 1 as a primary channel, and uses channels 2, 3 and 4 as secondary channels, and a station transmits a probe request frame through channel 1, the access point may transmit a probe response frame through channel 1. However, if a station transmits a probe request frame through channel 2, 3 or 4, the access point does not transmit a probe response frame.

Figure 10:
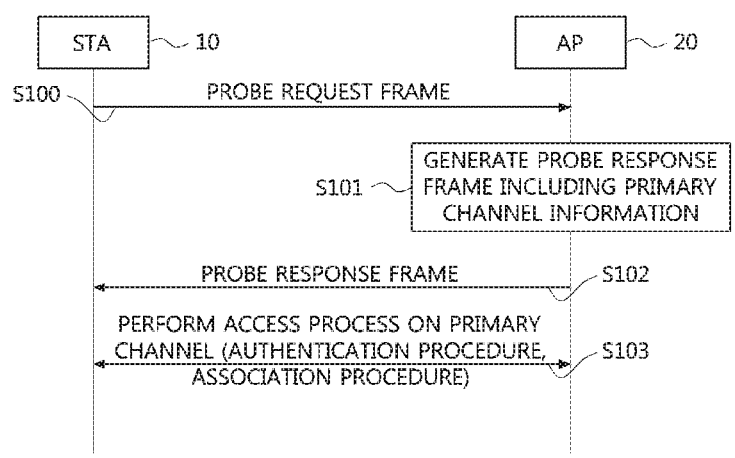
FIG. 10 is a flowchart showing an active scanning method according to an example embodiment of the present invention.

FIG. 10 is a flowchart showing an active scanning method according to an example embodiment of the present invention.

Referring to FIG. 10, a station 10 may transmit a probe request frame through a certain channel (S100). The station 10 may support a single channel or a broad band. When the station 10 supports a broad band, the certain channel may represent a primary channel or a secondary channel of the station 10.

Upon receiving a probe request frame through the certain channel, an access point 20 may generate a probe response frame including information about a primary channel of the access point 20 if the certain channel is a secondary channel of the access point 20 (S101). In this case, the access point 20 may represent an access point supporting a broad band, and may receive a probe request frame through a primary channel or a plurality of secondary channels of the access point 20.

The access point 20 may transmit the probe response frame including the information about the primary channel of the access point 20 through the certain channel (S102). The station 10 having received the probe response frame may move to a channel represented by the primary channel information included in the probe response frame, and perform an access process with respect to the access point 20 on the corresponding channel. That is, the station 10 may perform an authentication process and then an association process on the channel represented by the primary channel information.

Figure 11:
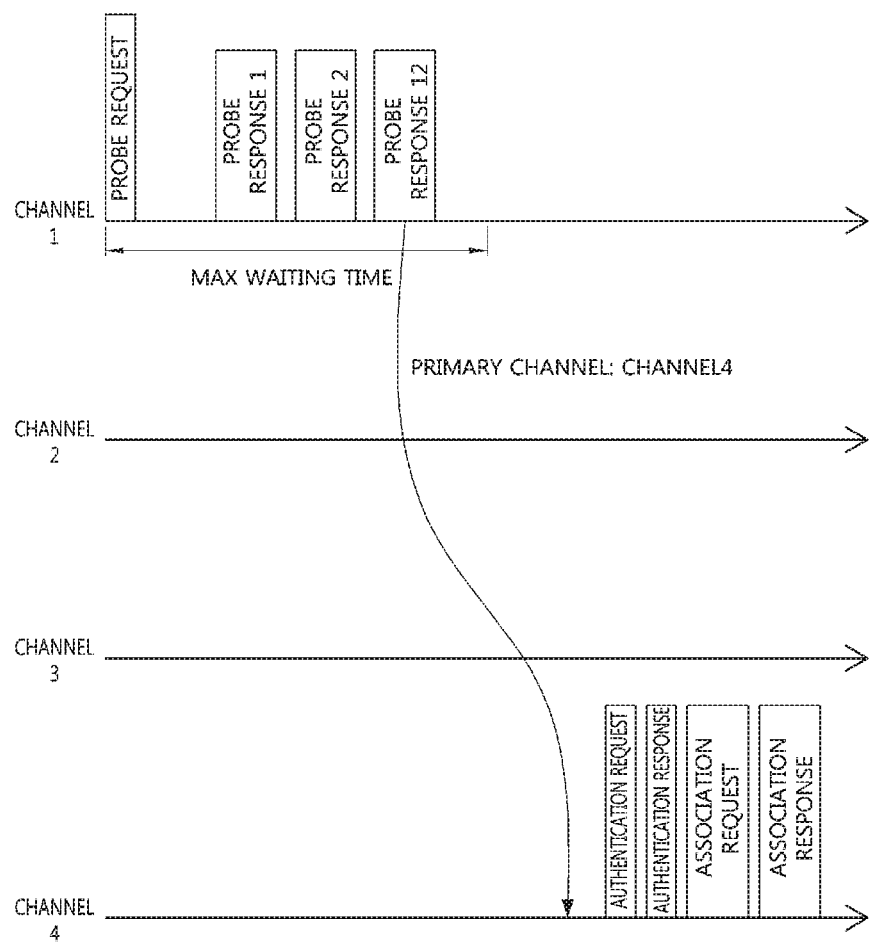
FIG. 11 is a flowchart showing an active scanning method in a single channel according to an example embodiment of the present invention.

FIG. 11 is a flowchart showing an active scanning method in a single channel according to an example embodiment of the present invention.

Referring to FIG. 11, the station transmits a probe request frame through a single channel, and an access point receives a probe request frame through a primary channel and a secondary channel of the access point. It is assumed that an access point to which the station desires access is access point, and access point uses channel 4 as a primary channel, and uses channels 1, 2 and 3 as secondary channels.

First, the station may transmit a probe request frame through channel 1, and receive probe response frames transmitted from access points during a maximum waiting time. When access point 1 and access point 2 each use channel 1 as a primary channel, access point 1 may transmit probe response frame 1 corresponding to the probe request frame and access point 2 may transmit probe response frame 2 corresponding to the probe request frame.

Meanwhile, access point, which uses channel 1 as a secondary channel, may generate probe response frame including information about a primary channel of access point (that is, channel 4), and transmit the generated probe response frame through channel 1.

The station receives probe response frame (that is, a probe response frame transmitted from access point which the station desires to find) through channel 1 during the maximum waiting time, thereby acquiring primary channel information included in probe response frame. Thereafter, the station moves to channel 4 represented by the primary channel information, and performs an access process (that is, an authentication process and an association process) with respect to access point.

In the conventional technology, a station may sequentially perform scanning in the order of [channel 1→channel 2→channel 3→channel 4] to find access point, which requires the amount of time [maximum waiting time×4]. Meanwhile, according to an example embodiment of the present invention, access point is found merely by performing scanning on channel 1, and the time taken to find a desired access point is reduced.

Figure 12:
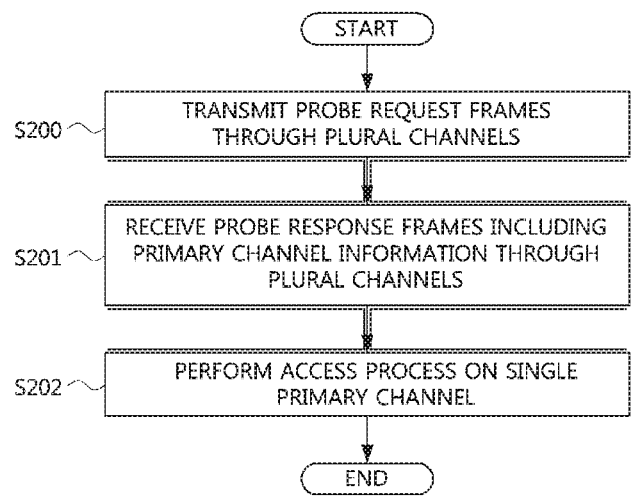
FIG. 12 is a flowchart showing an active scanning method according to another example embodiment of the present invention.

FIG. 12 is a flowchart showing an active scanning method according to another example embodiment of the present invention.

Referring to FIG. 12, a station may transmit probe request frames through a plurality of channels (S200). The station may support a broadband, and transmit probe request frames through a primary channel and a secondary channel. For example, when a station uses channel 1 as a primary channel, and uses channels 2, 3 and 4 as secondary channels, the station may simultaneously transmit probe request frames through channels 1, 2, 3 and 4.

If an access point having received a probe request frame supports a single channel, the access point transmits a probe response frame through the corresponding channel. Meanwhile, upon receiving the probe request frame through a plurality of channels, an access point supporting a broadband may transmit a probe response frame through one of the plurality of channels. If all of the plurality of channels are secondary channels of the access point, the access point may transmit a probe response frame including primary channel information of the access point through one of the plurality of channels. Meanwhile, if there is a primary channel of the access point in the plurality of channels, the access point may transmit a probe response frame (that is, a probe response frame including information about a primary channel of the access point) through the primary channel.

The station may receive a probe response frame from each access point through the plurality of channels (S201). The respective probe response frame may include information about a primary channel of the respective access point.

The station may acquire primary channel information from a probe response frame transmitted by a desired access point (that is, an access point to which the station desires access) among the probe response frames. Thereafter, the station may move to a channel represented by the primary channel information, and perform an access process (that is, an authentication process and an association process) with respect to the corresponding access point (S202).

Figure 13:
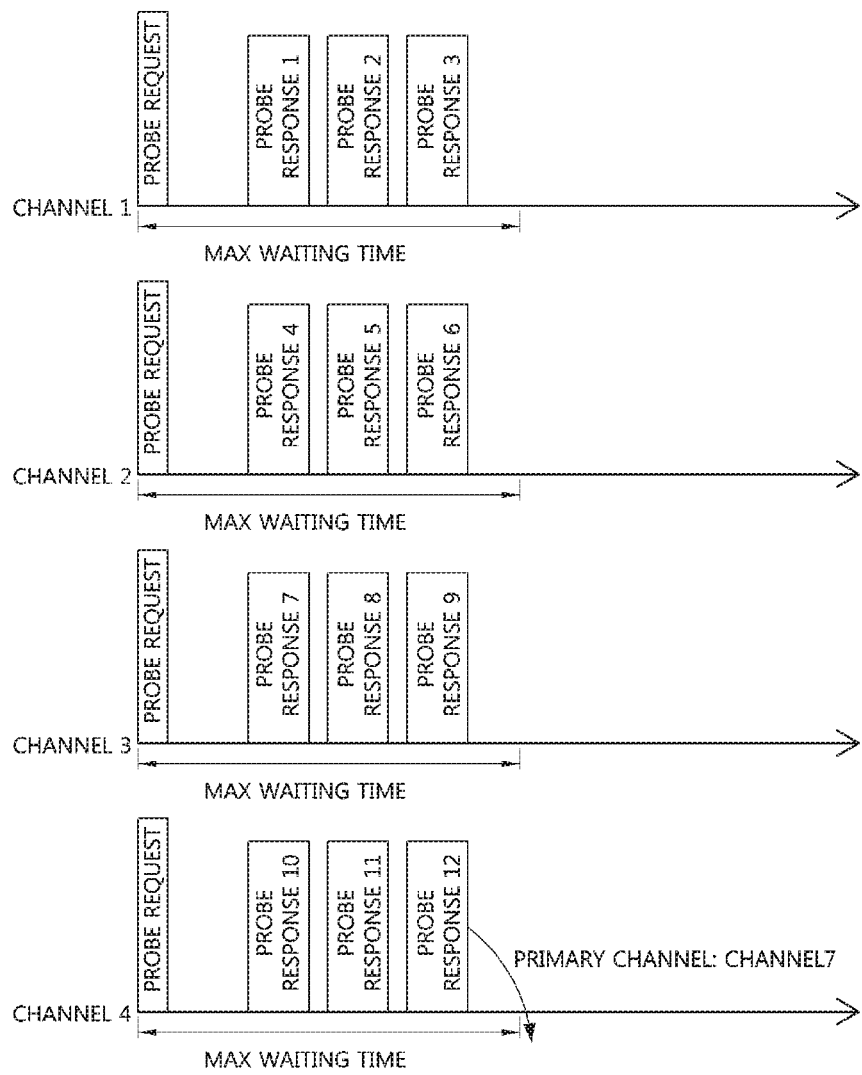
FIG. 13 is a conceptual view illustrating an example of an active scanning method according to another example embodiment of the present invention.

FIG. 13 is a conceptual view illustrating an example of an active scanning method according to another example embodiment of the present invention.

Referring to FIG. 13, a station transmits probe request frames through a plurality of channels (that is, channels 1, 2, 3 and 4), and an access point receives the probe request frame through a primary channel and a secondary channel. An access point to which the station desires access is access point, and access point uses channel 7 as a primary channel, and uses channels 4, 5 and 6 as secondary channels.

The station receives probe response frames 1, 2 and 3 during a maximum waiting time for channel 1, receives probe response frames 4, 5 and 6 during a maximum waiting time for channel 2, receives probe response frames 7, 8 and 9 during a maximum waiting time for channel 3, and receives probe response frames 10, 11 and 12 during a maximum waiting time for channel 4. Since access point has received a probe request frame through channel 4, which is a secondary channel of the access point, access point may transmit a probe response frame including information about a primary channel (that is, channel 7) of access point through channel 4 which is a secondary channel of access point.

Since probe response frame 12 is a probe response frame transmitted from access point to which the station desires access among the probe response frames received by the station, the station performs an access process to access point based on probe response frame 12.

That is, the station may move to channel 7 represented by the primary channel information included in probe response frame 12 and perform an access process (that is, an authentication process and an association process) with respect to access point on channel 7.

Figure 14:
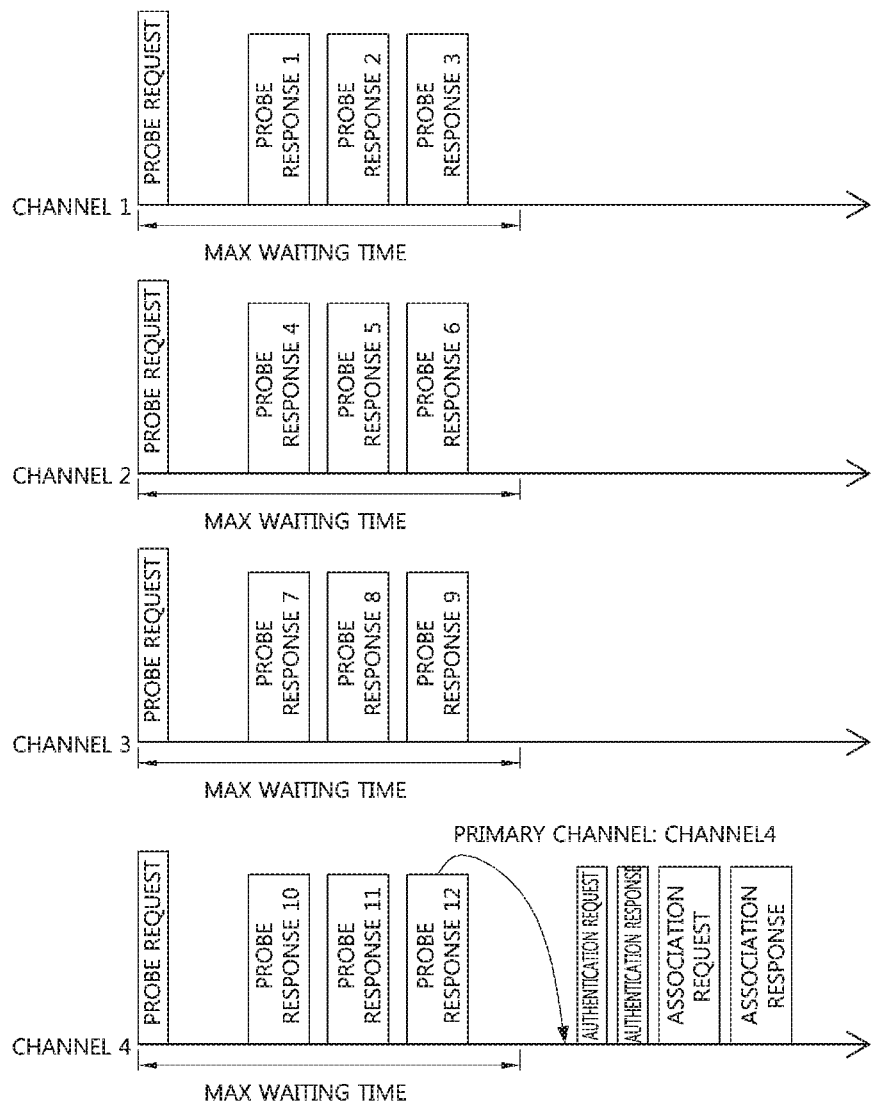
FIG. 14 is a conceptual view illustrating another example of an active scanning method according to another example embodiment of the present invention.

FIG. 14 is a conceptual view illustrating another example of an active scanning method according to another example embodiment of the present invention.

Referring to FIG. 14, a station transmits probe request frames through a plurality of channels (that is, channels 1, 2, 3 and 4), and an access point receives a probe request frame through a primary channel and a secondary channel. An access point that the station desires to find is access point, and access point uses channel 4 as a primary channel, and uses channels 1, 2 and 3 as secondary channels.

For example, if the station operates on a 4 MHz band, and each channel corresponds to a 1 MHz band, the station may transmit a probe request frame through multiple channels (that is, channels 1, 2, 3 and 4). Similarly, if the station operates based on a 2 MHz band, and each channel corresponds to a 1 MHz band, the station may transmit a probe request frame through multiple channels (that is, channels 1 and 2, channels 2 and 3, or channels 3 and 4). Multiple channels may include a primary channel and a secondary channel.

The station receives probe response frames 1, 2 and 3 during a maximum waiting time for channel 1, receives probe response frames 4, 5 and 6 during a maximum waiting time for channel 2, receives probe response frames 7, 8 and 9 during a maximum waiting time for channel 3, and receives probe response frames 10, 11 and 12 during a maximum waiting time for channel 4.

Since access point has received probe request frames through all channels (that is, channels 1, 2, 3 and 4), access point may transmit a probe response frame through one of the channels. There is a primary channel of the access point among the channels, and thus access point may transmit a probe response frame through channel 4. Probe response frame 12 transmitted by access point may include primary channel information about access point.

Meanwhile, if access point operates on a 4 MHz band, and each channel corresponds to a 1 MHz band, access point may transmit a probe response frame including primary channel information through multiple channels (that is, channels 1, 2, 3 and 4). Similarly, if the access point operates on a 2 MHz band, and each channel corresponds to a 1 MHz band, access point may transmit a probe response frame including primary channel information through multiple channels (that is, channels 1 and 2, channels 2 and 3, or channels 3 and 4). Multiple channels may include a primary channel and a secondary channel.

Since probe response frame 12 is a probe response frame transmitted from access point that the station desires to find among the probe response frames received by the station, the station performs an access process to access point based on probe response frame 12.

That is, the station may perform an access process (that is, an authentication process and an association process) with respect to access point on channel 4 represented by primary channel information included in probe response frame 12.

As is apparent from the above, a station may receive a probe response frame including information about a primary channel of an access point, and perform access with respect to the access point on a channel represented by the information about the primary channel, thereby reducing the time spent scanning for an access point.

While the example embodiments of the present invention and their advantages have been described in detail, it should be understood that various changes, substitutions and alterations may be made herein without departing from the scope of the invention.

What is claimed is:

1. A method by a station for performing active scanning, the method comprising:
    transmitting, over a first channel width corresponding to multiple of a second channel width, a probe request frame; and
    receiving, over the first channel width, a probe response frame corresponding to the probe request frame from an access point,
    wherein the probe response frame includes information on a primary channel of the access point,
    wherein the first channel width includes a plurality of channels, and each of channels has the second channel width, and wherein the first channel width is greater than the second channel width, and
    wherein the information on the primary channel indicates which the second channel width is the primary channel among the plurality of channels included in the first channel width.

2. The method of claim 1, wherein the information on the primary channel being information on location of the primary channel.

3. A method by an access point for responding to active scanning, the method comprising:
    receiving, over a first channel width corresponding to multiple of a second channel width, a probe request frame; and
    generating, over the first channel width, a probe response frame in response to the probe request frame,
    wherein the probe response frame includes information on a primary channel of the access point,
    wherein the first channel width includes a plurality of channels, and each of channels has the second channel width, and wherein the first channel width is greater than the second channel width, and
    wherein the information on the primary channel indicates which the second channel width is the primary channel among the plurality of channels included in the first channel width.

4. The method of claim 3, wherein the information on the primary channel being information on location of the primary channel.

5. A station for performing active scanning, the station comprising:
    a transceiver; and
    a processor,
    wherein the processor is configured to:
    transmit, using the transceiver, over a first channel width corresponding to multiple of a second channel width, a probe request frame; and
    receive, using the transceiver, over the first channel width, a probe response frame corresponding to the probe request frame from an access point,
    wherein the probe response frames include information on a primary channel of the access point,
    wherein the first channel width includes a plurality of channels, and each of channels has the second channel width, and wherein the first channel width is greater than the second channel width, and
    wherein the information on the primary channel indicates which the second channel width is the primary channel among the plurality of channels included in the first channel width.

6. An access point for responding to active scanning, the access point comprising:
    a transceiver; and
    a processor,
    wherein the processor is configured to:
    receive, using the transceiver, over a first channel width corresponding to multiple of a second channel width, a probe request frame; and
    generate, using the transceiver, over the first channel width, a probe response frame in response to the probe request frame,
    wherein the probe response frame includes information on a primary channel of the access point,
    wherein the first channel width includes a plurality of channels, and each of channels has the second channel width, and wherein the first channel width is greater than the second channel width, and
    wherein the information on the primary channel indicates which the second channel width is the primary channel among the plurality of channels included in the first channel width.

* * * * *

UNITED STATES PATENT AND TRADEMARK OFFICE
CERTIFICATE OF CORRECTION

PATENT NO. : 10,743,244 B2
APPLICATION NO. : 15/667146
DATED : August 11, 2020
INVENTOR(S) : Jeong et al.

It is certified that error appears in the above-identified patent and that said Letters Patent is hereby corrected as shown below:

In the Claims

In Claim 1, at Column 11, Line 36, after the word "frame" insert -- "," --.
In Claim 1, at Column 11, Line 36, after the word "frame" insert -- "," --.
In Claim 1, at Column 11, Line 41, after the words "each of" insert -- the plurality of --.
In Claim 1, at Column 11, Line 45, after the word "which" insert -- of --.
In Claim 2, at Column 11, Line 49, after the words "information on" insert -- a --.
In Claim 3, at Column 12, Line 4, after the words "each of" insert -- the plurality of --.
In Claim 3, at Column 12, Line 8, after the word "which" insert -- of --.
In Claim 4, at Column 12, Line 12, after the words "information on" insert -- a --.
In Claim 5, at Column 12, Line 23, after the word "frame" insert -- "," --.
In Claim 5, at Column 12, Line 24, after the word "frame" insert -- "," --.
In Claim 5, at Column 12, Line 25, delete "frames" and insert therefor -- frame --.
In Claim 5, at Column 12, Line 25, delete "include" and insert therefor -- includes --.
In Claim 5, at Column 12, Line 28, after the words "each of" insert -- the plurality of --.
In Claim 5, at Column 12, Line 32, after the word "which" insert -- of --.
In Claim 6, at Column 12, Line 49, after the words "each of" insert -- the plurality of --.
In Claim 6, at Column 12, Line 53, after the word "which" insert -- of --.

Signed and Sealed this
Fourteenth Day of May, 2024

Katherine Kelly Vidal
*Director of the United States Patent and Trademark Office*